Patented Nov. 15, 1949

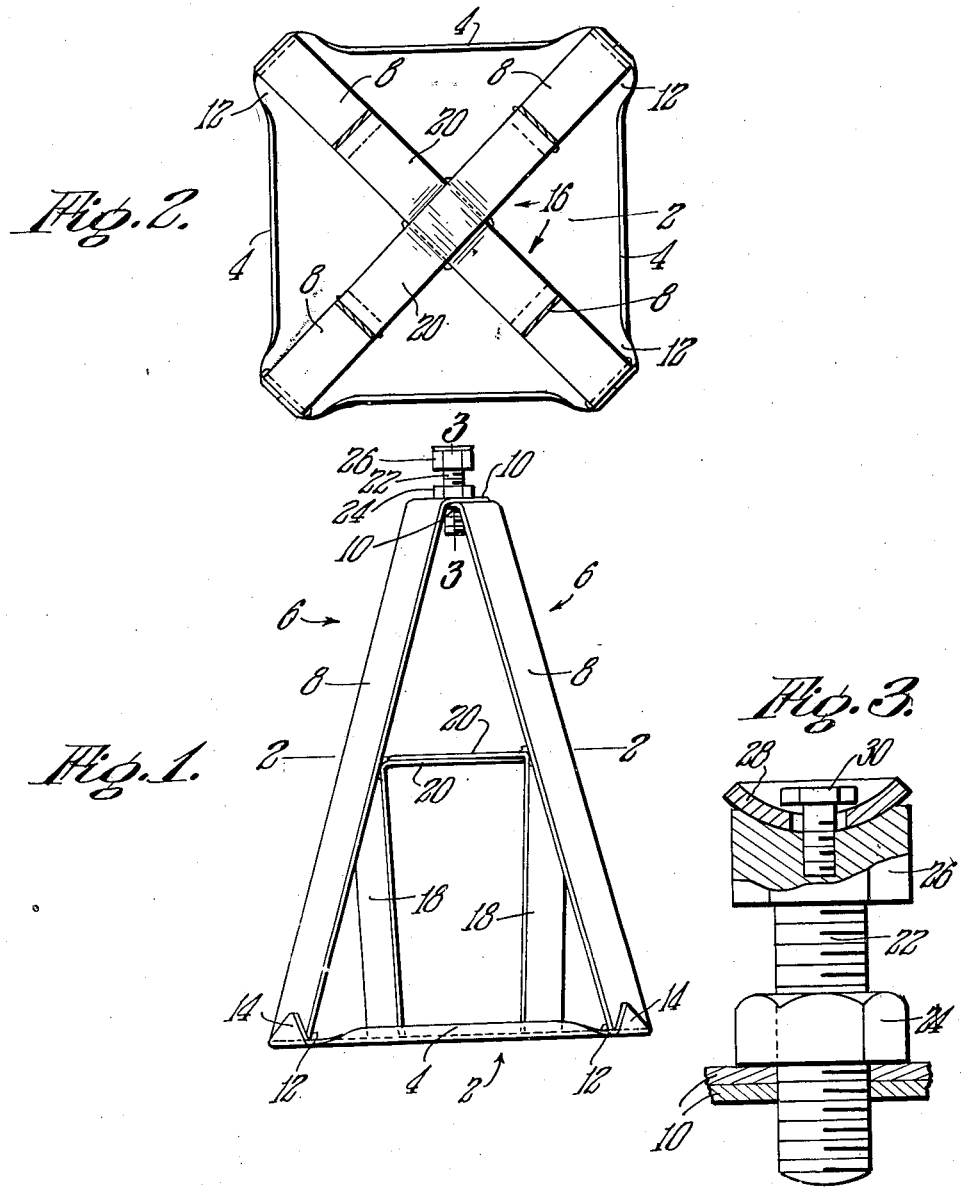

2,487,827

UNITED STATES PATENT OFFICE 2,487,827

LEVELING SUPPORT

Henry Persson, Bloomfield, N. J., assignor to Tage G. Persson, Bloomfield, N. J.

Application September 5, 1946, Serial No. 694,873

3 Claims. (Cl. 248—354)

This invention relates to supporting means and is directed more particularly to improvements in a leveling and support structure.

The principal objects of the invention are directed to the provision of a leveling support adapted among other uses for supporting a trailer.

It is customary to place blocks of various kinds under trailers to support them when not being hauled on the road. Trailers are likely to be blocked up where the soil is soft so that the blocks sink into the ground and at best it is difficult if not impossible to support the trailer so that it is level. Where a trailer is not supported in a level relation it is strained and distorted which results in damage to the structure.

According to this invention a device is provided which is adapted to support a trailer and it is adjustable for leveling the trailer so that with four of the devices located beneath the four corners of a trailer it may be leveled up and adequately supported in level condition.

The device is constructed in a novel manner so as to answer the requirements of strength, light weight and adjustability.

Various changes and modifications may be made in the form of the device without departing from the scope of the invention which in the preferred form thereof is shown in the accompanying drawing wherein:

Fig. 1 is a side elevational view of a leveling support embodying the novel features of the invention;

Fig. 2 is a sectional plan view on the line 2—2 of Fig. 1 and

Fig. 3 is a sectional elevational view on the line 3—3 of Fig. 1.

Referring now to the drawings more in detail the invention will be fully described.

A supporting plate 2 is provided which may be rectangular in shape and made from relatively thin sheet metal, say steel about one-eighth inch in thickness.

The opposite and adacent side edges of the plate are turned upwardly to provide reinforcing flanges 4 which stiffen the said plate.

Supports 6 are provided which are in the form of inverted U's having side portions 8 which diverge downwardly from intermediate portions 10.

The intermediate portions 10 are arranged in superposed relation and are secured together in any suitable manner such as by welding.

The side portions 8 diverge downwardly to the corner portions 12 of the plate 2 and are secured to said plate by welding or the like. The corners 14 of the plate 2 are turned upwardly to overlie the lower extremities of the members 8, as shown.

Inner braces 16 are provided which are in the form of inverted U's having side portions 18 converging downwardly from intermediate portions 20. The intermediate portions 20 are in superposed relation and are secured together by welding or the like. The lower ends of the members 18 are secured to the plate 2 by welding. Also the jointure of the members 18 and 20 abut inner sides of the members 8 and are welded thereto.

A jack screw 22 is in threaded engagement with the superposed members 10 and a lock nut 24 is provided thereon for abutting the uppermost member 10 to lock and hold the screw against turning.

The head 26 of the screw 22 has a concave seat on its upper side in which is a washer 28 formed to be complemental thereto. A screw 30 extends through an enlarged opening in the washer, as shown. The screw 30 and opening in the washer 28 are arranged to allow the washer to assume various positions on the screw head 26.

One of the leveling supports may be placed beneath opposite corners of a trailer and the screws turned to bring up against the trailer to adjust and level as well as support the trailer in a level condition.

The members 6 and 16 are made from relatively thin metal of relatively narrow width say one-eighth by one and one-half inches. The members 8 being secured to the plate the edges of which are turned upwardly there is provided a strong rigid structure which is further strengthened by the braces 16. These braces not only support the members 8 but by extending to the central part of the plate prevent upward distortion of the plate when the device is under a load.

The novel construction makes it possible to provide a support which is light in weight while at the same time it is strong and rigid to provide means for supporting a trailer in level relation. The base plate covers a considerable area of ground so as to overcome the possibility of sinking into the ground. Altogether the device is adapted for many uses and is readily and easily manipulated for its supporting and leveling function.

Various changes and modifications may be made in the form of the invention without departing from the spirit and scope thereof.

I claim:

1. A device of the class described comprising in combination, a base plate horizontally disposed having tab portions turned upwardly at marginal sides thereof, a pair of supports each in the form of an inverted U made from a single strip of metal to have an intermediate upper horizontal portion and side members extending downwardly at opposite ends thereof in diverging relation, lower extremities of the side members of said supports being rigidly secured to tab portions of said base plate and upper portions of said supports being in superposed secured together relation with the side members of one of said supports disposed in a plane at right angles to the plane of the other of said supports and screw means threadedly engaging the intermediate portions of said supports.

2. A device of the class described comprising in combination, a base plate horizontally disposed having opposite and adjacent tab portions turned upwardly from the plane at marginal sides thereof, a pair of supports each in the form of an inverted U made from a single strip of metal to have an intermediate upper horizontal portion and side members extending downwardly at opposite ends thereof in diverging relation, lower extremities of the side members of said supports being rigidly secured to tab portions of said base plate and the upper portions of said supports being in superposed secured together relation with the side members of one of said supports disposed in a plane at right angles to the plane of the other of said supports screw means threadedly engaging the intermediate portions of said supports, and a pair of braces each in the form of an inverted U made from a single strip of metal to have an intermediate upper horizontal portion and side members extending downwardly from opposite ends thereof, said braces being disposed within said supports with the horizontal portions thereof in superposed relation below the horizontal portions of said supports, the jointure of the horizontal portions and side members of the braces abutting inner sides of the side members of the supports and secured thereto and lower extremities of the side members being secured to said base plate.

3. A trailer support comprising in combination, a horizontally disposed supporting plate having opposite side edges turned upwardly providing reinforcing flanges, a pair of inverted U-shaped primary supports having lower primary extremities fixed to said plate and having intermediate primary portions arranged in superposed secured-together relation, a pair of inverted U-shaped secondary supports having lower secondary extremities fixed to said plate and having intermediate secondary portions arranged in superposed secured-together relation and fixed to said primary supports, a jack screw in threaded engagement with and adjustable in openings in the intermediate primary portions of said primary supports.

HENRY PERSSON.

REFERENCES CITED

The following references are of record in the file of this patent:

UNITED STATES PATENTS

| Number | Name | Date |
|---|---|---|
| 1,272,589 | Whitney | July 16, 1918 |
| 2,106,230 | Whitson | Jan. 25, 1938 |
| 2,356,941 | Meyer | Aug. 29, 1944 |
| 2,388,308 | Court | Nov. 6, 1945 |